(12) United States Patent
Nowack et al.

(10) Patent No.: US 6,179,012 B1
(45) Date of Patent: Jan. 30, 2001

(54) SYNCHRONIZED DRIVE SYSTEM FOR A LENO SELVEDGE

(75) Inventors: Klaus Nowack, Bocholt; Christoph Schwemmlein, Borken-Weseke; Werner Wanning, Südlohn, all of (DE)

(73) Assignee: Klocker Entwicklungs-GmbH, Borken (DE)

( * ) Notice: Under 35 U.S.C. 154(b), the term of this patent shall be extended for 0 days.

(21) Appl. No.: 09/406,044

(22) Filed: Sep. 27, 1999

Related U.S. Application Data

(63) Continuation-in-part of application No. PCT/DE98/00257, filed on Jan. 29, 1998.

(30) Foreign Application Priority Data

Apr. 18, 1997 (DE) .............................................. 197 16 349

(51) Int. Cl.$^7$ .............................. D03C 7/04; D03D 51/02; H02P 7/34
(52) U.S. Cl. .............................................. 139/54; 361/243
(58) Field of Search .............................. 361/243; 310/95, 310/67 R; 139/54

(56) References Cited

U.S. PATENT DOCUMENTS

| | | |
|---|---|---|
| 3,010,051 | 11/1961 | Lindemann . |
| 5,996,646 * | 12/1999 | Hockemeyer et al. ................ 139/54 |
| 5,996,647 * | 12/1999 | Krumm ................................. 139/54 |
| 6,006,792 * | 12/1999 | Krumm et al. ....................... 139/54 |
| 6,006,793 * | 12/1999 | Krumm et al. ....................... 139/54 |

FOREIGN PATENT DOCUMENTS

| | | |
|---|---|---|
| 4405777 | 8/1995 | (DE) . |
| 19520500 | 8/1996 | (DE) . |
| 19548955 | 9/1996 | (DE) . |
| 0750061 | 12/1996 | (EP) . |
| 9429502 | 12/1994 | (WO) . |

OTHER PUBLICATIONS

Patent Abstracts of Japan; vol. 015, No. 227 (C–0839), Jun. 10, 91 & JP 03 069627 A (Toyota Autom Loom Works Ltd), Mar. 26, 1991.

\* cited by examiner

*Primary Examiner*—Andy Falik
(74) *Attorney, Agent, or Firm*—Thomas R. Vigil

(57) ABSTRACT

The mechanical loom includes a drive unit for a shaft of a device from a leno selvedge and is synchronized with the frames of a mechanical loom. The drive unit comprises a first electromotor and a second electromotor. The drive shaft (111) is actrated by the first electromotor (110) (driving motor) and is electrically coupled with the second electromotor (120) driven by the driven shaft (121) of the mechanical loom, by at least two phases of alternating current waveforms carried by two or three electric transmission wires coupling the first and second electromotors together.

6 Claims, 1 Drawing Sheet

SYNCHRONIZED DRIVE SYSTEM FOR A LENO SELVEDGE

CROSS-REFERENCE TO RELATED APPLICATIONS

This Application is a Continuation-In-Part Application of PCT Application No. PCT/DE 98/00257 filed Jan. 29, 1998 which claims priority from German Application No. 197 16 349.1 filed Apr. 18, 1997 and is a Continuation-In-Part Application of U.S. Application Ser. No. 08/844,200 filed Apr. 28, 1997, now U.S. Pat. No. 5,857,495, which is a Continuation of PCT/EP 96/01294 filed Mar. 23, 1996, which claims priority from German Application No. 195 18 427 filed May 19, 1995 and German Application No. 195 20 500 filed Jun. 3, 1995.

BACKGROUND OF THE INVENTION

1. Field of the Invention

The present invention relates to a drive unit for a shaft of a device forming a leno selvedge and synchronized with the frames of a mechanical loom.

2. Description of the Prior Art

The document DE 195 48 955 C1 discloses a device for forming a leno selvedge that is provided with an electromotor whose rotors are having two arms arranged like propeller blades. These arms are provided at their end with an eye through each of which a doup end is guided. The rotation of the rotor and thus the rotation of the arms are creating, together with the weft thread, the leno selvedge. In order to avoid a permanent connection of the doup ends in the area of the spools, the sense of rotation of the motor is reversible.

Devices intended to form a leno selvedge and driven by a shaft are known for example out of DE-PS 195 20 500.6. Up to now, such a device is mechanically coupled to the drive unit of a mechanical loom, a further shaft being usually flanged to the driven shaft of a mechanical loom, that means to a shaft that is coupled to the actuation of the mechanical loom and that drives the accessory units. This further shaft may for example be designed as a flexible shaft that drives the shaft of the device for forming a leno selvedge. It is necessary to have the device for forming a leno selvedge directly driven by a corresponding driven shaft of the mechanical loom because the leno selvedge device has to run in unison with the heald frames of the mechanical loom. That means that the position of the different thread guide elements of the leno selvedge device is depending on the position of the heald frames and subsequently on the angle of aperture of the shed.

Modern mechanical looms often proved to no more have a need for a driven shaft for accessory units, as for example a leno selvedge device, that could be used as actuation for such a device. And even when a mechanical loom is provided with such a driven shaft, the shaft often has such a disadvantageous position that the mechanical coupling between the driven shaft and the shaft of the leno selvedge device require complicated measures.

SUMMARY OF THE INVENTION

The object of the present invention is therefore to provide a drive unit of the type mentioned above with the help of which a synchronization with the movement of the heald frames of a mechanical loom is made possible without any direct mechanical coupling, as for example by means of a flexible shaft.

The solution of this object is to provide a shaft that may be actuated by a first electromotor (driving motor) that is electrically coupled with an electromotor driven by the driven shaft of the mechanical loom by electric transmission wires carrying at least three phases of alternating current waveforms. Such three phase alternating current waveforms synchronize the operation of the driving motor for the leno selvedge device with the driven shaft of the mechanical loom.

The electromotor driving the shaft of the leno selvedge device is more particularly coupled with the second electromotor working like a generator and drivable by the shaft of the mechanical loom in such a way that the phase position of the second electromotor is electrically calipered as a signal with the help of which the electromotor actuating the shaft of the leno selvedge device may be actuated. The first and second electromotor are hereby designed as asynchronous motors. The stator coils of the first and second motors are connected in parallel, the power supply for the first and second motors being advantageously provided by the stator coil since the stator coil, being mounted in a stationary outer shell of the electromotor and being located outwardly of the rotor coils mounted in a rotor of the electromotor a better position to carry off an excess of heat.

The rotor coils of the second motor may be connected to the network in two phases and the rotor coils of the motor for the leno selvedge device in one phase, whereas the rotor coils of the second motor (generator) and the rotor coils of the first motor (driving motor) may be connected to one another in two phases.

In order to explain the invention with the help of an example shown in the attached drawing which shows a circuit diagram of the three phase electric transmission wire wave with the motor driving the leno selvedge device and with the second motor which is working like a generator being coupled to the driving shaft of the mechanical loom. This second motor is electrically coupled to the driving motor of the leno selvedge device.

DESCRIPTION OF THE PREFERRED EMBODIMENT(S)

Figure 1:
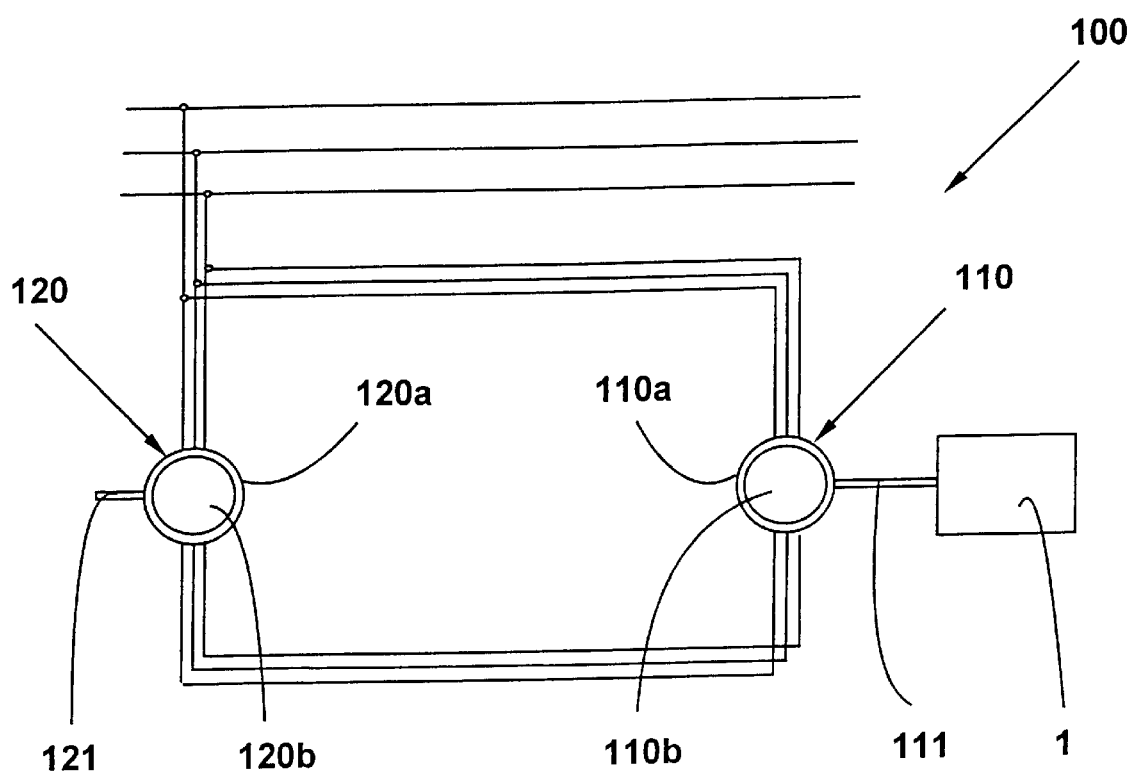
FIG. 1 is an electrical circuit diagram of the three phase electric transmission wires for transmitting at least three phases of alternating current waveforms between a first electromotor for driving the leno selvedge device and a second electromotor which functions like a generator, which is electrically coupled to the driving shaft of the mechanical loom.

The drawing shows the electrical circuit or network for the three phase transmission wires for transmitting at least three phases of alternating current waveforms. The network with the three phases is hereby designated with numeral 100; the first motor, that is, the driving motor for the leno selvedge device has been given the numeral 110. The motor 110 is driving the shaft 111 for the leno selvedge device 1. The second motor 120 that is working like a generator has a driving connection to the driving shaft 121 of the mechanical loom. The phase position is transmitted as an electric signal from motor 120 to motor 110 that is actuating the leno selvedge device via the shaft 111. The As may also be seen in FIG. 1, the rotors 110*b*, 120*b* and the stators 110*a*, 120*a* are each triphasic. The power supply to the rotor is made via slip rings by means of carbon brushes. The stator coils in the second motor, which is working like a generator, and those in the first motor are each connected in parallel. The rotor coils of this second motor are connected to the network in two phases, the rotor coils of the driving motor (second motor) in only one phase whereas the two motors are connected to each other in two phases.

What is claimed is:

1. Mechanical loom with a drive unit for a drive shaft (111) of a device forming a leno selvedge and synchronized with the frames of a mechanical loom, characterized in that said drive unit comprises a first electromotor (110) and a second electromotor (120) and the drive shaft (111) is actuated by said first electromotor (110) (driving motor) that is electrically coupled with said second electromotor (120) which is driven by a driven shaft (121) of the mechanical loom and said first electromotor (110) is driven by a power supply comprising at least two phases of alternating current waveforms carried by at least two or three electric transmission wires coupling said first and second electromotors.

2. Mechanical loom according to claim 1, characterized in that the electromotor (110) driving the drive shaft (111) of the leno selvedge device (1) is coupled through an electrical network (100) comprising said electric transmitting wires with the second electromotor (120) working like a generator and drivable by the shaft (121) of the mechanical loom in such a way that the phase position of the second electromotor (120) is electrically calipered as a signal with the help of which the first electromotor (110) actuating the shaft (111) of the leno selvedge device is actuated.

3. Drive unit according to claim 1, characterized in that the first and second electromotors are asynchronous motors.

4. Mechanical loom according to claim 2, characterized in that the first electromotor (110) and the second electromotor (120) have stator coils which are connected in parallel.

5. Mechanical loom according to claim 4, characterized in that the power supply for the first electromotor (110) further includes the stator coils (120*a*) of the second electromotor (120).

6. Mechanical loom according to claim 2, characterized in that said second electromotor (120) includes rotor coils which are connected to the electrical network (100) in two phases and said first electromotor (110) includes rotor coils which are connected in two phases with the rotor coils of the second electromotor (120), and the rotor coils of the first electromotor (110) for the leno selvedge device are connected in one phase.

* * * * *